United States Patent [19]

Koleske et al.

[11] Patent Number: 5,179,183
[45] Date of Patent: Jan. 12, 1993

[54] CURABLE COMPOSITIONS BASED ON (N-SUBSTITUTED CARBAMOYLOXY)ALKANOYLOXYALKYL ACRYLATE POLYMERS

[75] Inventors: Joseph V. Koleske, Charleston, W. Va.; Donald F. Smith, Jr., Bridgewater; Robert J. Weber, Jr., Neshanic, both of N.J.

[73] Assignee: Union Carbide Chemicals & Plastics Technology Corporation, Danbury, Conn.

[21] Appl. No.: 373,544

[22] Filed: Jun. 30, 1989

Related U.S. Application Data

[62] Division of Ser. No. 67,828, Jun. 30, 1987, Pat. No. 4,847,329.

[51] Int. Cl.⁵ .................... C08F 26/02; C08F 126/02; C08F 226/02; C08L 61/28

[52] U.S. Cl. .................... 526/301; 525/107; 525/118; 525/119; 525/123; 525/162; 525/178; 525/183; 525/208; 528/354; 528/359

[58] Field of Search ................ 526/301; 528/354, 359; 525/107, 118, 119, 123, 178, 183, 208

[56] References Cited

U.S. PATENT DOCUMENTS

| Re. 30,234 | 3/1980 | Sampson et al. | 525/162 |
|---|---|---|---|
| 4,340,497 | 7/1982 | Knopf | 252/188.3 R |
| 4,504,635 | 3/1985 | Weber et al. | 525/450 |
| 4,618,635 | 10/1986 | Osborn et al. | 524/113 |
| 4,680,361 | 7/1987 | Koleske et al. | 526/318 |
| 4,683,287 | 7/1987 | Koleske et al. | 528/357 |

*Primary Examiner*—Paul R. Michl
*Assistant Examiner*—Tal H. Yoon
*Attorney, Agent, or Firm*—S. H. Hegedus

[57] ABSTRACT

Curable compositions based on (N-substituted carbamoyloxy)alkanoyloxyalkyl acrylate polymers. When cured the compositions are, for example, high-quality industrial finishes, sealants or encapsulants.

23 Claims, No Drawings

CURABLE COMPOSITIONS BASED ON (N-SUBSTITUTED CARBAMOYLOXY)ALKANOYLOXYALKYL ACRYLATE POLYMERS

This application is a divisional application of copending application Ser. No. 067,828, filed Jun. 30, 1987, now U.S. Pat. No. 4,847,329.

DESCRIPTION OF THE PRIOR ART

In the field of coating technology, efforts have been made and are presently being made to alter the various properties of coatings so they will have improved performance characteristics and, for example, provide improved corrosion resistance or other protection, aesthetic appeal, electrical resistance, etc., or a combination of such properties. Improvements in solvent resistance, adhesion, flexibility, hardness, impact resistance, or an optimization of such properties, is always highly desirable and makes the coatings more suitable for use as appliance finishes, automobile finishes, wood finishes, business machine finishes, house siding finishes, transportation finishes, general metal finishes, and the like.

It is known that the inclusion of epsilon-caprolactone and other lactones in coating compositions improves flexibility of the final coatings. For example, U.S. Pat. No. Re. 30,234 describes the reaction of epsilon-caprolactone with a copolymer of, e.g., styrene and 2-hydroxyethyl acrylate, and thereafter with a crosslinking agent, e.g., melamine formaldehyde, to give a crosslinked, modified copolymer having desirable flexibility, hardness, and chemical durability.

U.S. Pat. No. 4,504,635, entitled "Process for the Preparation of Polymeric Compositions", describes a process for the polymerization of a reactive monomer derived from the reaction product of a hydroxyalkyl acrylate or methacrylate and a lactone with other ethylenically unsaturated monomers. The polymeric compositions of this patent were combined with conventional crosslinking agents, plus other normally used formulating ingredients, and made into coatings. The acrylic and styrene/acrylic coatings of this patent, while generally useful, were deficient for some end uses with respect to hardness, with all but one coating composition having a pencil hardness of less than H. This one coating had an H hardness.

U.S. Pat. No. 4,340,497, entitled "(N-Substituted Carbamamoyloxy) Alkanoyloxyalkyl Acrylate Esters," describes esters such as those described by Formula I of this invention. The patent teaches that these monomeric esters can be homopolymerized or formulated with other acrylate-containing co-monomers into radiation-curable systems. This patent does not, however, teach or suggest further functionalizing the system by reaction with di- or polyfunctional monomers to produce oligomers which can be cross-linked by reaction with, e.g., melamines. The disclosure of this patent is incorporated herein by reference.

Copending, co-assigned U.S. patent application Ser. No. 831,199, filed Feb. 20, 1986, now U.S. Pat. No. 4,680,361, describes carboxyl-terminated monomers similar (except for the carboxyl termination) to those of the instant invention which can be polymerized with other ethylenically unsaturated monomers, and thereafter cross-linked by reaction with, e.g., melamines.

The polymeric compositions and processes of the present invention utilize novel compositions containing a reactive monomer derived from the reaction product of a hydroxyalkyl acrylate or methacrylate and a lactone, such as epsilon-caprolactone, that is subsequently reacted with an isocyanate to produce an alkyl-capped urethane which can polymerize with functionalized or non functionalized ethylenically unsaturated monomers and thereafter can be used as a thermoplastic coating, adhesive, or sealant composition, and the like, or can be crosslinked to give polymeric coating, adhesive, ink or sealant compositions having a highly desirable combination of flexibility and hardness in addition to excellent adhesion, solvent resistance, hydrolytic stability, and chemical compatibility. Related reactive monomers derived from the reaction of a hydroxyalkyl acrylate or methacrylate and a lactone, such as epsilon-caprolactone, are described more fully in U.S. patent application Ser. No. 895,594, filed on Aug. 14, 1986 now U.S. Pat. No. 4,683,287.

SUMMARY OF THE INVENTION

The present invention is directed to crosslinked compositions comprising one or more prepolymers obtained by polymerizing, to a molecular weight of about 400 to about 150,000, one or more ethylenically unsaturated monomers with a composition comprising:

(a) 0 to 10 weight percent, preferably 0 to 5 weight percent, of a lactone;

(b) 0 to about 10 weight percent of hydroxyethyl acrylate or methacrylate;

(c) 0 to about 2 weight percent, preferably 1 or less weight percent, of one or more diacrylates;

(d) 0 to about 10 weight percent, preferably 5 or less weight percent, of products resulting from Michael addition, acrylate polymerization, transesterification reactions, or other side reactions;

(e) 0 to about 50 weight percent, preferably 0 to about 20 weight percent, of a reactive monomer of the following average formula:

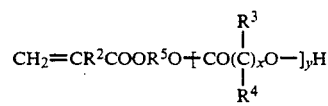

wherein $R^5$ is a divalent radical, $R^2$ is either hydrogen, methyl or cyano, each of $R^3$ and $R^4$ is hydrogen, phenyl, or lower alkyl having 1 to about 6 carbon atoms, x is an integer having a value of up to about 10, and y is an integer having a value up to about 20;

(f) remainder to 100 weight percent of a reactive monomer of the following average formula:

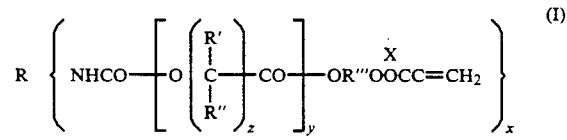

wherein R is an unsubstituted or substituted (i) linear or branched alkyl group having from 1 to 4 carbon atoms, or (ii) aryl, alkaryl or aralkyl group having 6 or 10 ring carbon atoms, or (iii) cycloalkyl group having from 5 to 8 ring carbon atoms when x is 1, and polyvalent alkylene, arylene, alkarylene or cycloalkylene having carbon atom values defined for (i) to (iii) supra and a valence equal to the value of x when x is greater than 1; wherein the substituents on the R group are not reactive with the isocyanato radical; R' and R" are each hydrogen, phenyl or alkyl having from 1 to about 6 carbon atoms; R''' is a linear or branched divalent alkylene of 1 to 10 carbon atoms, preferably 2 to 4 carbon atoms, divalent cycloalkylene of 5 to 12 carbon atoms, preferably 6 to 8 carbon atoms, or divalent arylene of 6 to 10 ring carbon atoms; X is hydrogen; methyl or cyano; x has a value of from 1 to 4; y is an integer having an average value of from 1 to about 20, preferably from 1 to about 6 and most preferably from 1 to 4; and z is an integer having a value of from 3 to about 10, preferably 5 or 6.

The prepolymers of this invention are typically soluble in common organic solvents, and, at relatively high molecular weights, are thermoplastic in nature. They are particularly useful in formulations for coatings, adhesives, sealants, inks, encapsulants, and the like, wherein they are used alone (except for additives known to the art) as thermoplastic lacquers when the molecular weight is sufficiently high, or are combined with various crosslinking agents and additives known to the art, and are capable of controlled crosslinking, making them useful in coatings, inks, adhesives, and sealants.

As used herein, the terms "polymeric," "polymer" and "prepolymer" are intended to include oligomers. It will be understood by those skilled in the art that the above compositions can be advantageously controlled in molecular weight, and will produce a high molecular weight polymer in the absence of any factor which would terminate the reaction short of completion. On the other hand, it is also within the scope of this invention to produce the above compositions in relatively low molecular weight form, as by appropriate control of reaction conditions, addition of a chain transfer or terminating agent, and the like. Such lower molecular weight polymers are particularly suitable in coating formulations which are to be cross-linked, as by reaction with, e.g., melamines. When so used, the polymers of this invention desirably have a molecular weight range of about 400 to about 150,000, preferably about 500 to about 50,000, and most preferably about 1,000 to about 10,000.

In addition, the invention is directed to curable compositions comprising one or more ethylenically unsaturated monomers in combination with items (a)–(f), above, further in combination with a free radical-generating catalyst, and optionally further in combination with an effective amount of a chain-terminating or chain-transfer agent. As indicated above, these curable compositions may be used as thermoplastic lacquers, or in thermoset, crosslinked systems.

The invention is further directed to a process for preparing polymeric compositions comprising polymerizing the above compositions in the presence of a catalyst.

The invention is still further directed to a process for preparing a crosslinked polymeric coating composition comprising: (1) polymerizing one or more ethylenically unsaturated monomers in combination with items (a)–(g), above, and (2) crosslinking the polymeric composition of (1) with an (a) isocyanate resin, or (b) with an amino resin selected from the group consisting or melamine formaldehydes, urea formaldehydes, and benzoguanamine formaldehydes, or (c) with an epoxide resin which is preferably a cycloaliphatic epoxide resin, or (d) with a multifunctional isocyanate, or (e) with a multifunctional carbodiimide.

The compositions of this invention in their liquid form exhibit highly desirable stability and chemical compatibility, and in their cured form, as in coatings, sealants, and encapsulants, they exhibit solvent resistance, and hardness in combination with toughness. The polymeric compositions and the crosslinked polymeric coating compositions prepared by the above-described processes are also part of this invention.

DETAILED DESCRIPTION OF THE INVENTION

The novel compositions of this invention contain a reactive (N-substituted carbamoyloxy) alkanoyloxyalkyl acrylate ester of the type given in Formula I, above. Monomers of this type are thoroughly disclosed in U.S. Pat. No. 4,340,497, as already indicated, the disclosure of which is incorporated herein by reference. Such monomers are produced, preferably, by a two-step process that can, if desired, be carried out sequentially in the same reactor. The compounds have monofunctionality when a monoisocyanate is used in the second step of the reaction and polyfunctionality when a polyisocyanate is used.

In the first step of the reaction a hydroxyalkyl acrylate of the general formula:

wherein X and R''' are as previously defined, is reacted with a lactone of the general formula:

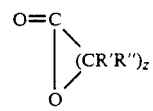

wherein R', R" and z are as previously defined, to produce the adduct.

Illustrative of suitable hydroxyalkyl acrylates or methacrylates or cyanoacrylates one can mention hydroxyethyl acrylate, hydroxyethyl methacrylate, hydroxyethyl cyanoacrylate, hydroxypropyl acrylate, hydroxybutyl acrylate, hydroxybutyl methacrylate, hydroxydecyl acrylate, hydroxydecyl methacrylate, hydroxydecyl cyanoacrylate, hydroxycyclohexyl acrylate, hydroxycyclohexyl methacrylate, hydroxycyclooctyl acrylate, and the like. Those skilled in the art are fully familiar with this class of compounds, and will appreciate that mixtures can also be used.

Illustrative of suitable lactones, one can mention beta-butyrolactone, epsilon-caprolactone, zeta-enantholactone, delta-valerolactone; the alkyl-delta valerolactones, such as the methyl-, ethyl-, hexyl-, dimethyl-delta-valerolactones; the alkyl epsilon-caprolactones, such as the methyl-, ethyl-, hexyl-, dimethyl-, diethyl-, di-n-propyl-, di-n-hexyl-, di-iso-propyl-, trimethyl-, triethyl-, tri-n-propyl-epsilon-caprolactones, and the like. The lactones are known to those skilled in the art, and it will be appreciated that mixtures can be used. Suitable lactone-acrylate adducts are more fully described in U.S. Pat. No. 4,504,635, the disclosure of which is incorporated herein by reference.

In the second step of the reaction the adduct whose preparation was described above is reacted with an organic isocyanate. The suitable isocyanates can be mono-, di-, tri-, or tetra-isocyanates, and many such compounds are known and are commercially available. They can be used singly or in admixture, and illustrative thereof one can mention methyl isocyanate, ethyl isocyanate, propyl isocyanate, butyl isocyanates, chloroethyl isocyanate, chlorobutoxypropyl isocyanate, hexyl isocyanates, phenyl isocyanate, the o-, m-, and p-chlorophenyl isocyanates, benzyl isocyanate, naphthyl isocyanate, p-ethylphenyl isocyanate, the di-chlorophenyl isocyanates, methyl isocyanate, butyl isocyanate, n-propyl isocyanate, octadecyl isocyanate, 3,5,5-trimethyl-1-isocyanato-3-isocyanatomethylcyclohexane, di(2-isocyanato-ethyl)-bicyclo (2.2.1)-hept-5-ene-2,3-dicarboxylate, 2,4-tolylene diisocyanate, 2,6-tolylene diisocyanate, 4,4'-diphenylmethane diisocyanate, dianisidine diisocyanate, tolidene diisocyanate, hexamethylene diisocyanate, m- and p-xylylene diisocyanate, tetramethylene diisocyanate, dicyclohexyl-4,4'-methane diisocyanate, cyclohexane-1,4-diisocyanate, 1,5-naphthylene diisocyanate, 4,4'-diisocyanate diphenyl ether, 2,4,6-triisocyanate toluene, 4,4',4"-triisocyanatotriphenyl methane, diphenylene-4,4'-diisocyanate, the polymethylene polyphenylisocyanates, as well as any of the other organic isocyanates known to the average skilled chemist.

The amount of isocyanate used is an amount to provide sufficient isocyanato equivalents to react with the reactive hydroxyl equivalents on the adduct. As previously indicated, when a monoisocyanate is employed, the N-(substituted carbamoyloxy)alkanoyloxyalkyl (or aryl) acrylate ester of Formula I is monofunctional in respect to acrylyl functionality and when a polyisocyanate is used such Formula I ester is polyfunctional in respect to acrylyl functionality. The term "acrylyl" includes acrylyl and substituted acrylyl, such as methacrylyl and cyanoacrylyl groups.

The lactone acrylate and monoisocyanate are combined and allowed to react at temperatures from about room temperature to about 120° C. for periods of time ranging from less than an hour to several days, with the length of time depending on the reaction temperature and the reactivity of any particular isocyanate. If desired, temperatures less than room temperature can be used, with the reaction time being increased as the temperature is decreased. The preferred reaction temperatures are from about 20° C. to about 80° C. for about four hours to about four days. The reaction is carried out in an oxygen-containing atmosphere, which may be produced by blanketing the reactants with air, sparging the reactants with air, or by any other means that will introduce oxygen and inhibit reaction of the acrylate functionality. Although the reaction proceeds without an added catalyst, in certain instances it may be desired to add a catalyst to promote the reaction and minimize the reaction time. Suitable catalysts are those known to catalyze the reaction of hydroxyl groups and isocyanate groups to form urethane compounds, and are exemplified by compounds such as stannous octanoate, zinc octanoate, dibutyltindilaurate, and the like. It is desirable to add an inhibitor or free radical stabilizer to the reacting system to prevent gelation when oxygen alone is not sufficient for this purpose. A variety of quinones, such as hydroquinone monomethyl ether, hydroquinone, alkyl-and aryl-substituted hydroquinone, p-methyoxyphenol, and so on, can be used as free radical stabilizers. These inhibitors can be used in concentrations of from about 100 to about 2000 ppm, preferably from about 200 to about 700 ppm, of the reactants. In many instances, the starting lactone acrylate will contain one or more of these inhibitors. If desired, an inert solvent or a reactive solvent can be used in the preparation of the carboxyl-terminated lactone acrylates. Inert solvents are such materials as toluene, 1,1,1-trichloroethane, ethoxyethanol acetate, and the like, and reactive solvents are various compounds such as 2-ethyl hexyl acrylate, 1,6-hexanediol diacrylate, trimethylolpropanetriacrylate, and the like.

The amount of multifunctional isocyanate to be reacted with the caprolactone acrylate can be an amount sufficient to react with all of the hydroxyl groups; however, it may be desirable to use an amount of isocyanate which is insufficient to react with all of the hydroxyl groups present in the caprolactone acrylate. This amount will vary and can be from about 0.1 to one isocyanate equivalent or moity for each hydroxyl equivalent or group present in the caprolactone acrylate, preferably from about 0.3 to one isocyanate equivalent or moiety for each hydroxyl group present in the caprolactone acrylate, and more preferably from about 0.5 to one isocyanate equivalent or moiety for each hydroxyl group. In a most preferred instance, about 0.9 isocyanate equivalent or moiety is charged for each hydroxyl equivalent or group initially present in the reaction mixture.

If desired, when less than one equivalent of isocyanate is used per hydroxyl equivalent or group in the reaction mixture, the final product may be further reacted with sufficient or less than sufficient acetic anhydride to completely or partially cap or acetylate the remaining hydroxyl groups.

While a preferred embodiment of the lactone acrylates of this invention contains two molecules of caprolactone, on the average, per acrylate group, useful products can have from one to twenty or more lactone units, or can be a mixture of compounds that contain from one to about twenty or more lactone units. In addition, these units could be other lactones such as beta-propriolactone, delta-valerolactone, delta-butyrolactone, zeta-enantholactone, eta-caprylolactone, and so on, or substituted lactones such as 6-methyl-epsilon-caprolactone, 3-methyl-epsilon-caprolactone, 5-methyl-epsilon-caprolactone, 5-phenyl-epsilon-caprolactone, 4-methyl-delta-valerolactone, 3,5-dimethyl-epsilon caprolactone, and so on, or copolymers of such lactones, such as a copolymer of epsilon-caprolactone and epsilon-methyl-epsilon caprolactone, of epsilon caprolactone and eta-caprolactone, of delta-valerolactone and epsilon-methyl-epsilon caprolactone, and so on. In addition, combinations of lactones and oxides such ethylene oxide, propylene oxide, butylene oxide, and so on, can be used to make the "lactone acrylate" compounds. Of course, when desired, the lactone acrylate can be prepared from one or more lactones alone or in combination with one or more of the described oxides. In an embodiment of the invention, the lactone acrylate can be prepared by reacting a hydroxyalkyl acrylate and a mixture of caprolactone, diacid—such as adipic acid, and diol—such as ethylene glycol 1,6-hexane diol, and the like. Also useful in place of, or in addition to, diols are polyols, such as triols, tetrols, and so on. If desired, one or more oxides can be included in the reaction mixture. Further types of lactone acrylate will be those described above that have been end-capped with one or more moles of an alkylene oxide or of a tetrahydrofuran. For example, caprolactone acrylate

CH$_2$=CHCOOCH$_2$CH$_2$O—[—CO(CH$_2$)$_5$—O—]$_2$H can be reacted with n molecules of ethylene oxide to produce the following molecule:

CH$_2$=CHCOOCH$_2$CH$_2$O—[—CO(CH$_2$)$_5$—O—]$_2$[—CH$_2$CH$_2$—O—]$_n$H where n has a value of one to about ten or more. This oxide-capped molecule can be reacted with an anhydride to produce the molecules of this invention. If desired, the oxide-capped caprolactone acrylate could be further reacted with a lactone to form a block copolymer with alternating blocks that are the same or different in composition.

Although a variety of lactones can be used, the preferred lactones to be used in the preparation of the caprolactone acrylates are epsilon-caprolactone and substituted epsilon-caprolactone. The most preferred lactone is epsilon-caprolactone.

Other hydroxyalkyl acrylates that can be used to produce the lactone acrylates include diethylene glycol monoacrylate or monomethacrylate, glycerine or tri-methylolpropane mono- or diacrylate or mono- or di-methacrylate, pentaerythritol mono-, di-, or triacrylate or mono-, di-, or trimethacrylate, glucose or sorbitol mono-, di-, tri-, tetra-, and penta-acrylate, or mono-, di-, tri-, tetra-, and pentamethacrylate, and the like. If desired, mixtures of one or more of these acrylates can be used in preparing the lactone acrylates of this invention.

The monoisocyanates are preferred for reaction with the lactone acrylates. Among the various monoisocyanates that can be used in the practice of this invention are substituted and nonsubstituted alkylisocyanates, such as methyl isocyanate, ethyl isocyanate, n-propyl and isopropyl isocyanates, n-butyl isocyanate, isobutyl isocyanate, sec.-butyl isocyanate, t-butyl isocyanate, the amyl isocyanates, the hexyl isocyanates, and the like, the substituted and unsubstituted aromatic isocyanates, such as phenyl isocyanate, naphthalene isocyanate, toluene isocyanate, and the like, the cyclic aliphatic isocyanates, such as cyclopentyl isocyanate, cyclohexyl isocyanate, norbornene isocyanate, and the like, as well as other monoisocyanates, including those having substituents thereon, such as halogen atoms, alkyl, alkoxy, or nitro, or aromatic groups, such as aryl, or other groups that will not unduly interfere with the reaction. In addition, when desired, mixtures of one or more monoisocyanates can be used.

In preferred embodiments according to U.S. Pat. No. 4,340,497, one may prepare a hydroxyethyl acrylate: epsilon-caprolactone adduct, which is further reacted with methylisocyanate to produce a compound having the average formula:

R$^6$NHCO(OC$_5$H$_{10}$CO)$_2$OC$_2$H$_4$OOCCH=CH$_2$ wherein R$^6$ can be CH$_3$—, (CH$_3$)$_2$CH—, or CH$_3$(CH$_2$)$_3$—.

Alternatively, such an acrylate-lactone adduct can be reacted with tolylene diisocyanate to produce a product having the average formula:

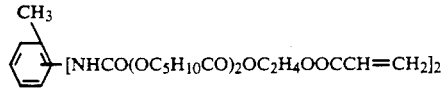

By doubling the concentration of hydroxyethyl acrylate used to prepare the caprolactone adduct, followed by reaction with methyl isocyanate, a product is obtained having the average formula:

R$^6$NHCOOC$_5$H$_{10}$COOC$_2$H$_4$OOCCH=CH$_2$

Alternatively, by doubling the concentration of epsilon-caprolactone used to prepare the adduct, followed by reaction with methyl isocyanate, a product is obtained having the average formula:

R$^6$NHCO(OC$_5$H$_{10}$CO)$_4$OC$_2$H$_4$OOCCH=CH$_2$

The ethylenically unsaturated lactone acrylates of this invention can be used in many ways. These ways of utilizing the compounds include homopolymerization or copolymerization with a variety of other suitable acrylates, methacrylates, or other ethylenically unsaturated compounds that will undergo copolymerization by free radical reaction techniques. Suitable compounds for copolymerization include methyl, ethyl, propyl, isopropyl, butyl, isobuty, secondary-butyl, tertiary-butyl, pentyl, neopentyl, isopentyl, hexyl, ethyl-hexyl, dodecyl, glycidyl, hydroxyalkyl, and so on, acrylates and methacrylates, acrylic and methacrylic acid, 2-polystyrylalkylmethacrylates as 2-polystyrylethylmethacrylate (Arco Chemical Co., Chemlink 4500), vinyl compounds such as vinyl acetate, vinyl chloride, vinylidene chloride, vinyl fluoride, styrene, acrylonitrile, methacrylonitrile, and the like.

The polymeric (including oligomeric) compositions and the crosslinked polymeric coating, sealing, and encapsulating compositions of this invention can be prepared by conventional polymerization techniques in which the novel ethylenically unsaturated lactone acrylate (or mixture of them) is blended with one or more ethylenically unsaturated monomers, polymerization catalysts, and, if desired, chain transfer agents, and polymerized by any one of a variety of polymerization techniques including bulk polymerization, solution polymerization, emulsion polymerization, aqueous or non-aqueous dispersion polymerization, and the like. The polymerizations can be carried out at temperatures of from about 60° C. to about 200° C. for periods of time of from about two hours to about 10 hours or more. The polymerization is preferably carried out in solution using a solvent in which the oligomeric or polymeric product is soluble. Solvents which can be used in the solution polymerization include, for example, methyl n-amyl ketone, methyl i-butyl ketone, methyl ethyl ketone, butyl alcohol, toluene, 2-ethoxyethyl acetate, butyl acetate, dioxane, toluene, xylene, isopropanol, and the like, as well as mixtures of these solvents.

Suitable polymerization catalysts include, for example, azo-bis-isobutyronitrile, lauroyl peroxide, benzoyl peroxide, t-butyl hydroperoxide, acetyl cyclohexane sulfonyl peroxide, diisobutyl peroxide, t-butyl perbenzoate, diisopropyl peroxydicarbonate, azo-bis-(2-methyl proprionitrile), and the like.

Suitable chain-transfer agents include t-dodecylmercaptan, and the like.

The oligomeric and polymeric products can also be prepared by any of the known emulsion polymerization, suspension polymerization, or bulk polymerization processes.

Suitable ethylenically unsaturated monomers which can be employed in this invention include, among others, the esters of acrylic or methacrylic acid and monohydric alcohols, hydroxyl-functional acrylic monomers, alpha, beta-ethylenically unsaturated carboxylic acids, vinyl hydrocarbons, and the like. The hydroxyl-functional acrylic monomers can include 2-hydroxyethyl acrylate, hydroxyethyl methacrylate, hydroxypropyl acrylate, hydroxypropyl methacrylate, hydroxybutyl acrylate, hydroxybutyl methacrylate, hydroxyhexyl acrylate, hydroxyhexyl methacrylate, glycerin mono- or diacrylate, glycerine mono- or dimethacrylate, lactone acrylates, as for example, TONE TM Monomer M-100 (available from Union Carbide Corporation), carboxyl derivatives of lactone acrylates, such as those described in copending, coassigned U.S. Ser. No. 831,777, filed Feb. 20, 1986, now U.S. Pat. No. 4,786,749, and the like. Suitable esters of acrylic or methacrylic acid and monohydric alcohols include, among others, ethyl acrylate, n-butyl acrylate, i-butyl acrylate, s-butyl acrylate, t-butyl acrylate, propyl acrylate, 2-ethylhexyl acrylate, methyl acrylate, hexyl acrylate, cyclohexyl acrylate, decyl acrylate, and the like, as well as the methacrylates of these compounds. Suitable alpha, beta-ethylenically unsaturated carboxylic acids include, among others, acrylic acid, methacrylic acid, itaconic acid, crotonic acid, and the like. Suitable vinyl hydrocarbons include, for example, styrene, alpha-methyl styrene, vinyl toluene, vinyl cyclohexane, t-butyl styrene, p-methyl styrene, chlorstyrene, vinyl acetate, maleic anhydride, allyl alcohol, and the like. The preferred vinyl hydrocarbon is styrene. Other monomers, such as acrylonitrile, vinylidine chloride, methacrylonitrile, vinyl chloride, and the like, can be included in the compositions of this invention.

The concentration of the ethylenically unsaturated carbamoyloxycarboxylate lactone acrylates or methacrylates in the compositions of this invention can range from about 1 to about 100 weight percent, preferably from about 1 to about 60 weight percent, and most preferably from about 3 to about 40 weight percent. The concentration of the other ethylenically-unsaturated monomers in the compositions of this invention can range from about 0 to 99 weight percent, preferably from about 40 to about 99 weight percent, an, most preferably from about 60 to about 97 weight percent. Included in the compositions of this invention are the homopolymers of the ethylenically unsaturated carbamoxyloxycarboxylate lactone acrylates and methacrylates, and the copolymers made from mixtures of various ethylenically unsaturated lactone carbamoxyloxycarboxylate acrylates and methacrylates. The number average molecular weight of the polymeric compositions of this invention can range from 400 or less to about 500,000 or greater; however, a more generally useful upper range would be in the area of about 150,000.

The crosslinkable compositions of this invention will contain one or more compounds capable of reacting with the hydroxyl and other functional groups, if any, available, thereby effecting crosslinking. Suitable compounds are, for instance, an epoxide resin, an amino resin, an isocyanate resin, a carbodiimide resin, or a combination of such compounds. The epoxide resins include, for example, novolac epoxides, glycidyl ethers of various types, including diglycidyl ethers of Bisphenol-A, diglycidyl ethers of butanediol, and the like; homopolymers and copolymers that contain pendant epoxide groups, such as those made from glycidyl acrylate and/or methacrylate, with or without other ethylenically unsaturated monomers, e.g., vinyl chloride, vinyl acetate, styrene, hydroxyethyl acrylate, hydroxypropyl acrylate, and the like; cycloaliphatic epoxides, such as cyclohexene mono- and diepoxide, limonene mono- and diepoxide, and other cycloaliphatic epoxides known to those skilled in the art such as are described in U.S. Pat. Nos. 3,027,357; 2,890,194; 2,890,197; 3,117,009; 3,031,434; 3,125,592; and 3,201,360. Of particular interest is that portion of U.S. Pat. No. 3,027,357 beginning at column 4, line 11 to column 7, line 38, and that portion of U.S. Pat. No. 3,201,360 beginning at column 2, line 60 to column 4, line 43, which portions are incorporated herein by reference. Among the specific illustrative epoxides disclosed therein one can mention as particularly appropriate 3,4-epoxycyclohexylmethyl-3,4-epoxycyclohexane carboxylate, bis-(3,4-epoxy-cyclohexylmethyl)-adipate, vinylcyclohexene diepoxide, bis(2,3-epoxycyclopenyl)ether, epoxidized butadiene, epoxidized soybean oil, epoxidized linseed oil, methyl epoxy linseedate, epoxidized talates, butyl epoxy soyate, octyl epoxy linseedate, and the like. A preferred cycloaliphate epoxide is 3,4-epoxy-cyclohexylmethyl-3,4-epoxycyclohexane carboxylate. The concentration of the epoxide resin in the polymeric coating composition can range from about 5 or less to about 90 or more, preferably about 10 or less to about 75 or more, weight percent of the total weight of the crosslinkable composition.

The amino resin crosslinking agents are preferably formaldehyde derivatives, such as melamine formaldehydes, urea formaldehydes, and benzoquanamine formaldehydes. A melamine formaldehyde resin, such as hexamethoxymethyl melamine, is preferred. Butylolated melamine formaldehydes can also be used. The concentration of the amino resin in the polymeric coating compositions of this invention can range from about 10 or less to about 60 or more weight percent or more preferably from about 10 or less to about 50 or more, percent, of the total weight of the coating composition.

The isocyanate resin crosslinking agents that can be used include 2,4-tolylenediisocyanate, 2,6-tolylenediisocyanate, mixtures thereof, 4-4'-diphenylmethane diisocyanate, 4,4'-dicyclohexylmethane diisocyanate, isophorone diisocyanate, hexamethylene diisocyanate, and other di- or polyisocyanates.

The carbodiimide crosslinking agents that can be used include UCARLNK XL-20 and XL-25SE (available from Union Carbide), STABOXYL P (available from Mobay chemical), and the like.

In certain instances, a catalyst may be desired to improve the efficiency of the epoxide, amino resin, or isocyanate crosslinking reaction during curing into coatings, adhesives, or sealants. The concentration of catalyst can vary from zero to about 10 weight percent, preferably from about 0.05 to about 5 weight percent, based on the total weight of the coating composition. The particular catalyst used and its concentration are dependent, to a degree, on its catalytic activity and the specific components present in the coating composition. These catalysts are known to those skilled in the art and include sulfuric acid, hydrochloric acid, p-toluene sulfonic acid, methyl sulfonic acid, phosphoric acid and alkyl derivatives of phosphoric acid, maleic acid, trimellitic acid, triflic acid, salts of triflic acid such as the diethylammonium salt of triflic acid, the ammonium salt of triflic acid, stannous salt of triflic acid, stannous octanoate, uranyl nitrate, zinc octanote, and the like. In certain instances, mixtures of these catalysts may be desirable.

The crosslinkable polymeric coating compositions can also contain pigments, fillers, surfactants, flow and leveling agents, defoamers, and other additives conventionally present in coating compositions in their conventional quantities. Selection of particular ones is considered to be within the skill of the art. In preparing the crosslinkable polymeric compositions, the ingredients are mixed by the conventional procedures used in the production of paints, inks, adhesive, and sealant compositions. These procedures are so well known to those skilled in the art that they do not require further discussion here.

The crosslinkable polymeric compositions are applied to a surface or substrate by conventional means and then cured by heating at a temperature of about 50° C. to about 376° C., preferably from about 90° C. to about 200° C., for a period of time sufficient to obtain a dry film. Generally this time will range from about one minute to about two hours. The components present in a particular crosslinkable polymeric composition will determine the temperature and time that will be required to obtain an adequate cure and a good coating film.

The crosslinkable polymeric compositions of this invention can be high solids coating compositions and they can contain as much as 90 weight percent or more solids. Generally, the total solids content of the coating compositions of this invention ranges from about 10 weight percent or more, preferably from about 20 to about 75 weight percent, of the total weight, and most preferably from about 35 to about 90 percent by weight of the coating composition. In the case of screen-printed coatings and inks, for example, it may be desirable to use the compositions as 100% total solids systems, or even with added conventional thickening agents.

The compositions of this invention can contain various additives that are known to those skilled in the art. Such additives include, pigments, colorants, dyes, defoamers, thickeners, preservatives, mildew inhibitors, anti-sag agents, anti-settling agents, and the like.

The invention is further described in the examples which follow. All parts and percentages are by weight unless otherwise specified.

In the examples which follow, the cured compositions were evaluated according to one or more of the following procedures:

Forward Impact Resistance: a measure of the ability of a cured film coating to resist rupture from a falling weight. A Gardner Impact Tester using an eight-pound dart was used to test film coatings cast and cured on steel panels. The dart was raised to a given height in inches and dropped onto the coating side of the coated steel panel. The inches times pounds, designated inch-pounds, absorbed by the film without rupturing was recorded as the film's forward impact resistance.

Pencil Hardness (ASTM D-3363-74): pencil leads of increasing hardness values were forced against the film coating surface in a precisely defined manner until one pencil lead cut through the surface of the film coating. The surface hardness was considered as the hardest pencil grade which just failed to cut through the film coating surface. The pencil leads, in order of softests to hardest, were reported as follows: 6B, 5B, 4B, 3B, 2B, B, HB, F, H, 2H, 3H, 4H, 5H, 6H, 7H, 8H, and 9H.

Solvent Resistance: a measure of the resistance of the cured film to attack by acetone, reported as the number or rubs or cycles of acetone-soaked cheesecloth required to remove one-half of a cured film from the test area. This test was performed by stroking the cured film with acetone-soaked cheesecloth until that amount of film coating was removed. The number of cycles required to remove this amount of coating was a measure of the coating's solvent resistance.

Reverse Impact Resistance: a measure of the ability of a cured film coating to resist rupture from a falling weight. A Gardner Impact Tester using an eight-pound dart was used to test film coatings cast and cured on steel panels. The dart was raised to a given height in inches and dropped onto the uncoated side of the coated steel panel. The inches times pounds, designated inch-pounds, absorbed by the film without rupturing was recorded as the film's reverse impact resistance.

Crosshatch Adhesion: a lattice pattern with either six or eleven cuts in each direction was made in the coating film to the substrate and pressure-sensitive adhesive tape was applied over the lattice pattern and then removed. The adhesion was evaluated by comparison with descriptions and illustrations, as more fully detailed in ASTM D-3359-78.

EXAMPLES

The following examples illustrate, but in no way limit, the invention. All percentages are by weight.

GLOSSARY OF MATERIALS USED IN EXAMPLES

1. TONE TM Monomer M-100. A 2-mole caprolactone adduct of hydroxyethyl acrylate with an average molecular weight of about 344, marketed by Union Carbide Corporation.
2. CYMEL 303. An alkylated amino crosslinking agent of the melamine type marketed by American Cyanamide Co.
3. CYCAT 4040. An acid catalyst marketed by American Cyanamide Co.
4. ERL-4221. 3,4-epoxycyclohexylmethyl-3,4-epoxycylohexane carboxylate marketed by Union Carbide Corporation.
5. FC-520. A triflic acid salt catalyst marketed by 3M Co.
6. L-7610. A silicon/alkylene oxide copolymer marketed by Union Carbide Corporation.
7. VAZO-52. 2,2-azobis-(2,4-dimethylpentane nitrile), sold by E.I. du Pont de Nemours & Co.
8. Bonderite 100. Treated Steel Test panels sold by Parker Chemical Co.
9. XP-1512. An acrylate-functional, aliphatic urethane acrylate solution sold by Cargill of Carpentersville, Ill. An MSDS sheet for the product indicates that it is a 75/25 mixture of a urethane acrylate oligomer and 1,6-hexanediol diacrylate.
10. Irgacure 184. A free-radical-generating photoinitator sold by Ciba-Geigy.
11. L-5410. An alkylene oxide/silicone surfactant sold by Union Carbide Corporation.

EXAMPLE 1

This example describes the preparation of a carbamoyloxycarboxylate monomer of this invention. Six hundred eighty-eight grams of TONE TM Monomer M-100 were placed in a one-quart, brown-colored glass bottle. Then, 180 grams of n-butyl isocyanate were slowly added to the bottle over a 30-minute time period. The components were stirred during the addition, which was conducted at room temperature. About 30 minutes after the isocyanate was added, the mixture underwent a mild exotherm to about 70° C. The mixture was cooled in a water-bath to decrease the reaction rate. After 3.5 hours reaction time, infrared analysis indicated the reaction was almost complete. Two days later, infrared analysis indicated the desired reaction had been completed. The reaction may be depicted in the following manner:

$$CH_2\!=\!CHCOOCH_2CH_2\!-\!O\!-\![CO(CH_2)_5\!-\!O]_n\!-\!H + CH_3(CH_2)_3NCO \rightarrow CH_2\!=\!CHCOOCH_2CH_2\!-\!O\!-\![CO(CH_2)_5\!-\!O]_{n-1}CO(CH_2)_5OCONH(CH_2)_3CH_3$$

EXAMPLE 2

A crosslinkable acrylic resin containing the monomer of Example 1 was prepared in the following manner. An initiator and chain-transfer-agent mixture was prepared by dissolving 8.0 grams of VAZO 52 and 13.6 grams of t-dodecylmercaptan in 40 grams of methyl isobutyl ketone. A monomer mixture was prepared by mixing the following ingredients.

| Example 1 Monomer | 197.6 g |
|---|---|
| Styrene | 158.8 g |
| Hydroxyethylacrylate | 81.2 g |
| Acrylic Acid | 16.4 g |

The initiator and chain-transfer-agent mixture and the monomer mixture were combined and well mixed. A one-liter, three-neck, round bottom glass reaction flask was fitted with a mechanical stirrer, condenser, nitrogen inlet and outlet tubes, and a monomer feed line, and charged with 50.0 grams of methyl isobutyl ketone. The contents of the flask were heated to reflux (115° C.) and the above-described mixture was added dropwise to the refluxing solvent over a period of three hours with a mechanical pump while maintaining the contents of the flask at approximately 115° C. After all of the mixture had been added, the temperature of the system was decreased to 80° C. and 1.0 gram of VAZO 52 dissolved in 23.5 g of methyl isobutyl ketone were added over a period of 15 minutes. The temperature was maintained at 80° C. for an additional hour, and then the system was cooled to about 40° C. and discharged into a storage container for future use.

The product was a complex, oligomeric mixture with ethylenic unsaturation essentially completely reacted, and with hydroxyl and carboxyl functionality introduced for subsequent crosslinking.

EXAMPLE 3

This example illustrates the curing by crosslinking of the product of Example 2 into a hard, durable film. The following ingredients were combined in a glass bottle and well mixed.

| Example 2 product | 107.1 g |
|---|---|
| Cymel 303 | 33.0 g |
| Cycat 4040 | 1.0 g |
| Butanol | 5.0 g |
| Methyl isobutyl ketone | 20.0 g |

The solution was cast onto Bonderite 100 steel panels with a #4 "Doctor Blade" and allowed to air dry for 20 minutes. The coated panel was then cured for 20 minutes in a 150° C. oven. The panel was cooled to room temperature and found to have a pencil hardness of 8H and an impact resistance of 24 in.-lbs. in the forward direction and 4 in.-lbs. in the reverse direction.

EXAMPLE 4

A crosslinkable acrylic resin similar to that of Example 2 was prepared in the following manner. An initiator and chain-transfer-agent mixture was prepared by dissolving 7.0 grams of VAZO 52 and 12.0 grams of t-dodecylmercaptan in 40 grams of methyl isobutyl ketone. A monomer mixture was prepared by mixing the following ingredients:

| Example 1 Monomer | 173.0 g |
|---|---|
| TONE Monomer M-100 | 194.0 g |
| Styrene | 139.0 g |
| Acrylic Acid | 14.4 g |

The initiator and chain-transfer-agent mixture and the monomer mixture were combined and well mixed. A one-liter, four-neck, round bottom, glass reaction flask was fitted with a mechanical stirrer, condenser, nitrogen bubbler, and a monomer feed line, and charged with 50.0 grams of methyl isobutyl ketone. The contents of the flask were heated to reflux, and the above-described mixture was added at a rate of about 3 millimeters per minute until all had been added with a pump, while maintaining the contents of the flask at about 115° C. After all of the mixture had been added (about 3 hours elapsed time), the temperature of the system was decreased to 80° C. and 1.0 gram of VAZO 52 dissolved in 23.5 grams of methyl isobutyl ketone were added over a period of 15 minutes. The temperature was maintained at 80° C. for an additional hour and then the system was cooled to about 40° C. and discharged into a container for future use.

EXAMPLE 5

This example describes the cure or crosslinking of the oligomer made in Example 4 with a melamine crosslinking agent. The following ingredients were combined in a glass bottle and well mixed.

| Example 4 Product | 107.10 g |
|---|---|
| Cymel 303 | 33.0 g |
| Cycat 4040 | 1.0 g |
| Butanol | 5.0 g |
| Methyl Isobutyl Ketone | 20.0 g |

This solution was cast onto Bonderite 100 steel panels with a #4 "Doctor Blade" and allowed to air dry for 20 minutes. The coated panel was then cured for 20 minutes in a 150° C. oven. The panel was cooled to room temperature and found to have a pencil hardness of 7H and an impact resistance of 24 inch-pounds in the direct or forward direction and 16 inch-pounds in the reverse direction.

EXAMPLES 6, 7 AND 8

These examples describe the preparation of various carbamoyloxycarboxylate monomers. To 114.7 g amounts of TONE ™ Monomer M-100 that had been placed in brown bottles, the following ingredients were added.

|  | Example 6 | Example 7 | Example 8 |
|---|---|---|---|
| t-butyl isocyanate | 12.32 g | — | — |
| isopropyl isocyanate | — | 25.5 g | — |
| butyl isocyanate | — | — | 29.7 g |

These systems contained less than the stoichiometric amount of isocyanate needed to react with all of the hydroxyl groups present on the TONE monomer M-100. The amount of M-100 used contained 0.333 equivalent of hydroxyl and the isocyanate content of Example 6 was 0.124 equivalent, of Example 7 was 0.300 equivalent, and of Example 8 was 0.300 equivalent. Thus, the monomers formed were mixtures of the carbamoyloxycarboxylate of TONE M-100 and of TONE M-100 monomer. The combined ingredients were well mixed by stirring, the bottles capped, and then allowed to stand at room temperature. Immediately after mixing, an infrared scan was run. The mixtures were allowed to stand at room temperature until infrared analysis indicated that the 4.4 to 4.5-micron band characteristic of the —NCO group had disappeared. These systems were then stored at room temperature for future use.

EXAMPLES 9 TO 19

The following ingredients were placed in amber colored bottles, well mixed and then stored for use.

| Ingredients | 9 | 10 | 11 | 12 | 13 | 14 | 15 | 16 | 17 | 18 | 19 |
|---|---|---|---|---|---|---|---|---|---|---|---|
| XP-1512 | 9.55 | — | — | — | 14.32 | 4.78 | 14.32 | 4.78 | 14.32 | 4.78 | 4.78 |
| Ex. 6 Prod. | — | 9.55 | — | — | 4.78 | 14.32 | — | — | — | — | — |
| Ex. 7 Prod. | — | — | 9.55 | — | — | — | 4.78 | 14.32 | — | — | — |
| Ex. 8 Prod. | — | — | — | 9.55 | — | — | — | — | 4.78 | 14.32 | 9.55 |
| TONE M-100 | — | — | — | — | — | — | — | — | — | — | 4.77 |
| Irgacure 184 | 0.40 | 0.40 | 0.40 | 0.40 | 0.80 | 0.80 | 0.80 | 0.80 | 0.80 | 0.80 | 0.80 |
| L-5410 | 0.05 | 0.05 | 0.05 | 0.05 | 0.10 | 0.10 | 0.10 | 0.10 | 0.10 | 0.10 | 0.10 |

The above formulations were coated onto Bonderite #37 steel panels with a #20 wire-wound rod and cured with one pass under a 300 watt-per-inch, Fusion Systems ultraviolet light source at 10 feet per minute. In the case of Examples 10, 11, and 12, the coatings had a slight tack after ultraviolet light exposure, so they were given two more passes under the same light source at the same speed to determine if a tack-free coating could be formed. The slight tack remained, indicating that the glass transition temperature of the coating was below room temperature. Test results are summarized in Table I.

| Example | 9 | 10 | 11 | 12 | 13 | 14 | 15 | 16 | 17 | 18 | 19 |
|---|---|---|---|---|---|---|---|---|---|---|---|
| Acetone Double-Rubs | >100 | 10 | 10 | 10 | >100 | 30 | >100 | 15 | 92 | 20 | 30 |
| Pencil Hardness | HB | <6B | <6B | <6B | HB | <6B | 2B | <6B | HB | <6B | <6B |
| % Cross-Hatch Adhesion | 0 | 100 | 100 | 100 | 0 | 0 | 0 | 0 | 0 | 0 | 90 |
| Gardner Impact Forward, in.-lbs. | <5 | >320 | >320 | >320 | 125 | 50 | 50 | 75 | 50 | 25 | 50 |
| Reverse, in.-lbs. | 25 | >320 | >320 | >320 | 175 | 150 | 100 | 175 | 150 | 100 | 100 |

These results indicate that the monomers of this invention will cure by ultraviolet light chemistry into homopolymers (Examples 10, 11, 12) or copolymers (Examples 13-19).

EXAMPLES 20 and 21

These examples describe the ultraviolet light polymerization of the monomers of this invention with an acrylated epoxide (Celrad 3700, sold by Celanese Corp.). The following ingredients were placed in amber bottles, well mixed, coated onto Bonderite 37 steel panels with a #20 wire-wound rod, and cured with a 300 watt per inch Fusion Systems ultraviolet light curing unit at 10 feet per minute.

|  | Examples | |
|---|---|---|
|  | 20 | 21 |
| Ingredients |  |  |
| Acrylated Epoxide | 10.00 | 10.00 |
| Example 8 Product | 4.78 | 2.39 |
| TONE M-100 | — | 2.39 |
| Irgacure 184 | 0.40 | 0.40 |
| L-5410 | 0.05 | 0.05 |
| Coating Properties |  |  |
| Acetone Double-Rubs | >100 | >100 |
| Pencil Hardness | H | H |
| % Crosshatch Adhesion | 15 | 4 |
| Gardner Impact |  |  |
| Forward, in.-lbs. | <5 | <5 |
| Reverse, in.-lbs. | 25 | 25 |

These examples demonstrate that the monomers of this invention can be co-cured with ultraviolet light.

EXAMPLES 20 to 25

Acrylic resins containing the monomers of the Examples indicated below are prepared in the following manner. An initiator and chain-transfer-agent mixture are prepared as described in Example 2 except that 3.5 grams of VAZO-52 and 6.0 grams of t-dodecylmercaptan in 17.6 grams of methyl isobutyl ketone are used. A monomer mixture is prepared by mixing the following ingredients.

|  | Examples | | | | | |
|---|---|---|---|---|---|---|
| Ingredients | 20 | 21 | 22 | 23 | 24 | 25 |
| Example 1 Monomer | 87.0 | — | — | — | 87.0 | 45.0 |
| Example 6 Monomer | — | 70.0 | — | — | — | — |

-continued

| Ingredients | Examples | | | | | |
|---|---|---|---|---|---|---|
| | 20 | 21 | 22 | 23 | 24 | 25 |
| Example 7 Monomer | — | — | 100.0 | — | — | 45.0 |
| Example 8 Monomer | — | — | — | 90.0 | — | — |
| Styrene | 70.0 | 80.0 | 90.0 | 60.0 | 27.0 | 67.0 |
| Butyl Acrylate | 7.2 | 14.2 | 5.0 | 25.0 | 41.0 | 13.0 |
| Hydroxyethyl methacrylate | 35.9 | 30.0 | 5.0 | 25.0 | 20.0 | 25.0 |
| Acrylic Acid | — | 5.8 | — | — | 25.0 | 5.0 |

The initiator and chain-transfer-agent mixture and the monomer mixtures are combined and well mixed. Then the procedure used in Example 2 is followed to prepare the acrylic resins.

EXAMPLES 26–29

Coatings are prepared by combining the following ingredients and mixing well.

| Ingredients | Examples | | | |
|---|---|---|---|---|
| | 26 | 27 | 28 | 29 |
| Example 20 Resin, g | 100.0 | — | — | — |
| Example 21 Resin, g | — | — | 100.0 | — |
| Example 22 Resin, g | — | 100.0 | — | — |
| Example 24 Resin, g | — | 100.0 | — | — |
| 4,4′-diphenylmethane diisocyanate, g | 30.0 | — | — | — |
| 3,4-epoxycyclohexylmethyl-3′,4′-cyclohexane carboxylate, g | — | 35.0 | — | — |
| 4,4′-dicyclohexylmethane diisocyanate, g | — | 35.0 | — | — |
| Stannous octanoate, g | 0.7 | 1.0 | — | — |
| Diethylammonium triflate*, g | — | — | 0.4 | 0.7 |
| 1,1,1-trichloroethane, g | — | — | 0.4 | 0.7 |
| Xylene, g | 70 | 40 | — | 10 |
| Methyl isobutyl ketone, g | 10 | 40 | — | 35 |

*Available in solution form from 3M Co. as FC-520

The coatings are applied to Bonderite 37 steel panels, to tin-free steel panels, and to aluminum panels with a No. 20 wire-wound rod. After standing for 10 minutes under ambient conditions, the coatings are cured for 20 to 25 minutes at a temperature of about 125° to 135° C. Tack-free, useful coatings result.

We claim:

1. A crosslinkable composition comprising one or more prepolymers obtained by polymerizing, to a molecular weight of about 400 to about 150,000, one or more ethylenically unsaturated monomers with a composition comprising:
   (a) 0 to 10 weight percent of a lactone;
   (b) 0 to 10 weight percent of hydroxyethyl acrylate or methacrylate;
   (c) 0 to about 2 weight percent of one or more diacrylates;
   (d) 0 to about 10 weight percent of products resulting from Michael addition, acrylate polymerization, transesterification reactions, or other side reactions;
   (e) 0 to about 50 weight percent of a reactive monomer of the following average formula:

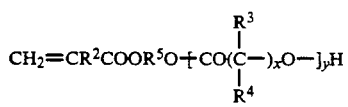

wherein $R^5$ is a divalent radical, $R^2$ is hydrogen, methyl, or cyano, each of $R^3$ and $R^4$ is hydrogen, phenyl, or lower alkyl having 1 to about 6 carbon atoms, x is an integer having a value of about 1 to about 10, and y is an integer having a value of about 1 to about 20;

(f) remainder to 100 weight percent of a reactive monomer of the following average formula:

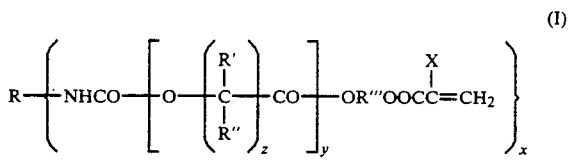

wherein R is an unsubstituted or substituted (i) linear or branched alkyl group having from 1 to 10 carbon atoms, or (ii) aryl, alkaryl or aralkyl group having 6 to 10 ring carbon atoms, or (iii) cycloalkyl group having from 5 to 8 ring carbon atoms when x is 1, and polyvalent alkylene, arylene, alkarylene or cycloalkylene having carbon atom values defined for (i) to (iii) supra and a valence equal to the value of x when x is greater than 1; wherein the substituents on the R group are not reactive with the isocyanato radical; R′ and R″ are hydrogen, phenyl, alkyl or alkoxy having from 1 to 6 carbon atoms; R‴ is a linear or branched divalent alkylene of 1 to 10 carbon atoms, divalent cycloalkylene of 5 to 12 carbon atoms, or divalent arylene of 6 to 10 ring carbon atoms; X is hydrogen, methyl or cyano; x has a value of from 1 to 4; y is an integer having an average value of from 1 to about 20, and z is an integer having a value of from 3 to about 10.

2. A crosslinkable composition of claim 1 wherein the molecular weight of the prepolymer is about 500 to about 50,000.

3. A crosslinkable composition of claim 2 wherein the molecular weight of the prepolymer is about 1,000 to about 10,000.

4. A crosslinkable composition of claim 1 wherein the prepolymer comprises a homopolymer of reactive monomer (f).

5. A crosslinkable composition of claim 1 wherein the prepolymer comprises a copolymer of reactive monomer (e) and (f).

6. A crosslinkable composition of claim 1 wherein lactone (a) is 0 to about 5 weight percent, diacrylates (c) are 0 to about 1 weight percent, products (d) are 0 to about 5 weight percent, and monomer (e) is about 0 to about 20 weight percent.

7. A crosslinkable composition of claim 1 wherein y is 1 to about 10 and x is 1 to 2.

8. A crosslinkable composition of claim 1, wherein R‴ is a linear or branched divalent alkylene of 2 to 4 carbon atoms, divalent cycloalkylene of 6 to 8 ring carbon atoms, or divalent arylene of 6 to 10 ring carbon atoms; y has an average value of from 1 to 6; and z has a value of from 4 to 6.

9. A crosslinkable composition of claim 1, wherein x is one and z is 5.

10. A crosslinkable composition of claim 1, wherein x is two and z is 5.

11. A crosslinkable composition of claim 1, wherein R′, R″ and X are hydrogen.

12. A crosslinkable composition of claim 1, wherein Formula I is

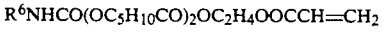

and $R^6$ is $CH_3$—, $(CH_3)_2CH$, or $CH_3(CH_2)_3$.

13. A crosslinkable composition of claim 1, wherein Formula I is

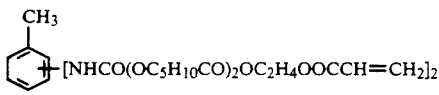

14. A crosslinkable composition of claim 1, wherein Formula I is $$R^6NHCOOC_5H_{10}COOC_2H_4OOCCH=CH_2$$

and $R^6$ is $CH_3$—, $(CH_3)_2CH$, or $CH_3(CH_2)_3$.

15. A crosslinkable composition of claim 1, wherein Formula I is $$R^6NHCO(OC_5H_{10}CO)_4OC_2H_4OOCCH=CH_2$$

and $R^6$ is $CH_3$—, $(CH_3)_2CH$, or $CH_3(CH_2)_3$.

16. A composition as defined in claim 1 wherein the ethylenically unsaturated monomer is styrene, hydroxyethyl acrylate, hydroxyethyl methacrylate, butyl acrylate, acrylic acid or mixtures thereof.

17. A composition as defined in claim 1 wherein the ethylenically unsaturated monomer or monomers also have non-ethylenically unsaturated functionality.

18. A composition as defined in claim 1 wherein the ethylenically unsaturated monomer is styrene.

19. A composition as defined in claim 1 wherein the ethylenically unsaturated monomer is hydroxyethyl acrylate.

20. A composition as defined in claim 1 wherein the ethylenically unsaturated monomer is hydroxyethyl methacrylate.

21. A composition as defined in claim 1 wherein the ethylenically unsaturated monomer is butyl acrylate.

22. A composition as defined in claim 1 wherein the ethylenically unsaturated monomer is acrylic acid.

23. A crosslinkable composition comprising one or more prepolymers obtained by polymerizing, to a molecular weight of about 400 to about 150,000, one or more ethylenically unsaturated monomers and a reactive monomer as defined in claim 1, paragraph (f).

* * * * *